United States Patent [19]

Wiggins

[11] 3,832,450
[45] Aug. 27, 1974

[54] CARBON BLACK PROCESS
[75] Inventor: Louis E. Wiggins, West Monroe, La.
[73] Assignee: Cities Service Company, New York, N.Y.
[22] Filed: Dec. 18, 1972
[21] Appl. No.: 316,200

[52] U.S. Cl.................. 423/450, 23/259.5, 423/456
[51] Int. Cl....... C01b 31/02, C09c 1/50, C09c 1/48
[58] Field of Search .......... 423/450, 455, 456, 457, 423/458; 23/259.5

[56] References Cited
UNITED STATES PATENTS

| | | | |
|---|---|---|---|
| 2,597,232 | 5/1952 | Ekholm et al. ...................... | 423/455 |
| 2,623,811 | 12/1952 | Williams ............................. | 423/458 |
| 2,980,511 | 4/1961 | Havard ............................... | 423/457 |
| 3,010,794 | 11/1961 | Friauf et al. ......................... | 423/450 |
| 3,475,125 | 10/1969 | Krejci ................................. | 423/457 |
| 3,592,599 | 7/1971 | Gohlke et al. ...................... | 423/450 |

Primary Examiner—Oscar R. Vertiz
Assistant Examiner—Gary P. Straub
Attorney, Agent, or Firm—Elton F. Gunn

[57] ABSTRACT
An oil furnace black process wherein a stream of liquid water intersects a liquid stream of feedstock hydrocarbon after streams of both liquids have been injected into a heated carbon black furnace. When the water stream contacts the liquid feedstock stream it is relatively cold in comparison to the temperature of the feedstock. Exothermic reaction of the feedstock with free oxygen present in the furnace is caused by contact with the water, and is characterized by a visible blazing and a substantial increase in temperature beyond the point at which the feedstock and the water are mixed. In the present invention the injection of water into the furnace thus serves a new and different purpose, i.e., in prior processes water has been injected to quench the temperature of a carbon black aerosol within the furnace or beyond it, and the water has thus been injected after formation of the carbon black had been at least substantially completed. In the present case water is injected into the feedstock hydrocarbon at a very early stage after it enters the furnace and instead of a quenching, the injection of water causes a flaming reaction of the feedstock with oxygen and thus promotes the formation of carbon black. The resulting carbon black products are characterized by an elevated iodine adsorption and/or an unusually high electrical conductivity.

13 Claims, 2 Drawing Figures

PATENTED AUG 27 1974                3,832,450

CARBON BLACK PROCESS

BACKGROUND OF THE INVENTION

This invention pertains to carbon black and more particularly to a process for making oil furnace blacks. In one specific embodiment of the invention oil furnace blacks are produced which are characterized by unusually low electrical resistivity and which are thus especially useful as an electrically conductive filler in strand shielding for wire cable, magnetic tape, antistatic fabricated rubber products, spray-paints, or coatings for paper, plastics, metals or cloth.

In oil furnace processes for producing carbon black, a mixture of air and fuel is burned in a furnace to produce a body of highly heated combustion gases which are contained within a furnace and into which a carbon black feedstock hydrocarbon is dispersed and pyrolyzed to form the desired carbon black product. Part of the feedstock hydrocarbon can serve as the fuel or a separate fuel can be employed. By absorption of heat from the hot combustion gases the dispersed feedstock hydrocarbon is first vaporized and is then pyrolyzed within the furnace, i.e., the feedstock is thermally decomposed and/or partially burned to form carbon black. This results in formation of an aerosol of carbon black suspended in the hot combustion gases and the gaseous products which result from thermal decomposition of the feedstock hydrocarbon. After formation of the carbon black the aerosol may be cooled by injection of a water quench, preferably to a temperature below 1,600°F., to preserve the yield and quality of the carbon black until it can be separated from the gaseous components of the aerosol by means of an electrostatic precipitator, cyclones, a bag filter, or a combination of such separatory devices.

In any event injection of water separately of the carbon black feedstock into the carbon black formation zone of a furnace has heretofore been at a locus where vaporization of the feedstock hydrocarbon and formation of the carbon black were both substantially completed, for the prior use of water injection has been directed toward cooling of the aerosol in order to preserve yield and to protect such physical and chemical properties of the carbon black as were already made extant by carefully established and controlled pyrolysis conditions.

SUMMARY OF THE INVENTION

The present invention resides in the surprising discovery that liquid water can be injected into a hot, liquid stream of feedstock hydrocarbon that is being introduced into a carbon black furnace to cause a violent, almost explosive exothermic reaction of the feedstock with free oxygen which is also being fed into the furnace. This reaction results in the formation of a bright flame immediately downstream of the point at which the water enters the hot feedstock stream while it is in the presence of free oxygen. Limited amounts of water are required for the purpose, e.g., about 1 gallon of water per 3–10 gallons of feedstock, and it will be appreciated that the water injection does not result in a quenching of the hot feedstock stream as would be expected but causes instead a promotion of vaporization and partial combustion of the feedstock, with vaporization apparently being effected earlier while partial combustion is initiated and perhaps completed somewhat sooner. As a consequence, both the thermal and chemical conditions of the reaction which take place along the carbon formation zone are considerably altered to the extent that certain properties of the resulting carbon black can be largely affected, e.g., iodine adsorption and electrical conductivity can be greatly increased.

DESCRIPTION OF PREFERRED EMBODIMENTS

The present invention is a new method for use with oil furnace processes for producing carbon black wherein a stream of carbon black feedstock hydrocarbon is injected into a furnace and the feedstock is vaporized and pyrolyzed to form carbon black by absorption of heat from hot combustion gases contained within the furnace. The hot combustion gases can be produced either by burning a portion of the carbon black feedstock itself with oxygen or a separate fuel such as natural gas or an oil can be burned. Oxygen for the burning is made available by mixing the fuel with air, oxygen-enriched air, pure oxygen or the like.

The feedstock hydrocarbon is injected as a liquid stream into the highly heated furnace and a stream of liquid water is then injected into the feedstock while the latter is being mixed with free oxygen but before it becomes substantially vaporized. More specifically, the injected water is forced into a hot feedstock stream in the presence of oxygen while the feedstock is still substantially in a liquid phase but is nonetheless heated to a temperature considerably beyond that of the liquid water that is injected into it.

The amount of liquid water that is injected into the liquid feedstock stream in accordance with the present invention is subject to considerable variation but it has been determined that satisfactory results are obtained when the volume ratio of feedstock hydrocarbon to water is within the range of about 3/1 to about 10/1 when both are measured at 60°F. More preferably, a ratio within the range of about 4/1 to about 6/1 is employed.

As was previously indicated the temperature of the liquid feedstock stream is relatively much hotter than the temperature of the liquid water stream when the two streams collide. More specifically the temperature differential, $\Delta T°$, of the two streams can be within the range of about 300°F. to about 700°F., and the differential can be even higher provided that most of the feedstock stream is still in a liquid form and no substantial formation of carbon black has occurred when the two streams intersect. In accordance with the present invention a liquid stream of feedstock hydrocarbon having a mean boiling point of about 750°–800°F. can thus be heated to a temperature of about 500°F. to 800°F. when intersected by a stream of liquid water having a temperature within the range of about 100°F. to 200°F.

The temperature of the feedstock hydrocarbon stream can be raised to the required temperature by preheating prior to injection into the furnace and/or by absorption of radiant heat after injection into the furnace. Superheated water can be employed in achieving the indicated $\Delta T°$, but this does not generally provide any advantage because the highest possible $\Delta T°$ between the feedstock and the water is generally desired and since oil furnace black processes are usually operated at pressure conditions which are close to atmospheric pressure and use of liquid water is essential in the present method as opposed to use of steam.

Proper conditions of mixing between the liquid water and hydrocarbon streams is characterized by a flaming with the free oxygen that is made present and by an increase in the temperature of the resulting mixture immediately beyond the point at which the water stream intersects the feedstock hydrocarbon stream. If the feedstock to water ratio is properly established and the $\Delta T°$ between the two streams is sufficiently great, a violent, almost explosive reaction occurs (akin to pouring cold water into very hot grease or oil) and this results in the development of a fast, blue flame. Although not wishing to be bound by theory, it is felt that this blazing exothermic reaction results from a release of hydrogen and/or carbon monoxide by forceful injection of relatively cold water into the hot liquid hydrocarbon and since the furnace is highly heated, these released materials react exothermically at great speed with the free oxygen that is present.

It will thus be appreciated that use of liquid water in accordance with present invention is entirely different from use of liquid water as a cooling medium in quenching procedures of the prior art. It is essential in the present invention that the water be separately injected into the furnace and that it be in a liquid phase when it contacts the hot, liquid feedstock hydrocarbon in the presence of free oxygen since equivalent results are not obtained if either liquid water or steam is mixed with the liquid feedstock beforehand or if steam is introduced into the furnace separately. When steam was tried in an attempt to duplicate the results obtained with the present invention, no equivalent disruption and exothermic reaction of the feedstock stream was observed, and when liquid water was first mixed with the liquid hydrocarbon and then introduced into the furnace along with the latter, the water heated up within the furnace at about the same rate as the hydrocarbon and the necessary $\Delta T°$ for violently disruptive and exothermic reaction of the hydrocarbon with oxygen in accordance with the present invention was not obtained.

To accomplish mixing of the liquid feedstock hydrocarbon stream with water during practice of the present invention, more or less conventional apparatus can be employed. The feedstock can, for instance, be injected into the furnace reaction chamber by means of well-known solid or hollow cone sprayers while employing a similar sprayer for the water. Positioning of the feedstock and water injection points relative to each other is important in assuring that both streams are liquid when they intersect and that the proper $\Delta T°$ is established. By use of positionable sprays, the optimum spatial relationship between the two points can be easily determined after conducting a few simple experiments while following the present disclosure as a guideline.

As was indicated previously, a fuel such as natural gas or an oil can be burned to produce hot combustion gases within which the unburned portion of the feedstock hydrocarbon is pyrolyzed in the furnace to produce carbon black. Alternatively, part of the injected carbon black feedstock can be burned as the fuel so that vaporization and pyrolysis of the remaining feedstock is accomplished by contact with the resulting hot gases. Air is preferred for supplying oxygen for combustion of the fuel, and in any event free oxygen must be made available for mixture with the liquid stream of feedstock that is in turn mixed with the stream of liquid water so that the previously described blazing reaction and partial combustion of the feedstock occurs at a very early stage and preferably before the remaining portion of the feedstock is pyrolyzed in the hot combustion gases beyond the flame in order to complete the formation of carbon black.

Proportioning of the feedstock with the hot combustion gases is subject to considerable variation and can be selectively adjusted and then maintained according to known practices for the production of carbon black having a specific particle size. Input rate of the feedstock and the hot combustion gases is also subject to variation in the usual sense depending upon the type of carbon black being produced and the size of the furnace being used.

The amount of free oxygen which should be made available for mixture and partial combustion of the feedstock hydrocarbon is subject to variation depending upon the extent of reaction and the resulting alteration of carbon black properties which may be desired. To considerable advantage air which is uncontaminated by combustion or pyrolysis products can be made available for mixture with the incoming hydrocarbon stream at the point of intersection with the water stream.

Therefore, features of the invention which are not regarded to be critical include the type and size of furnace that is employed, use of a portion of the injected feedstock as the fuel as opposed to use of another hydrocarbon, proportioning of air and fuel except that free oxygen must be made available for mixture with the liquid stream of feedstock at the point where the water is injected into it, and proportioning of the feedstock in the hot combustion gases created by burning of the fuel. Apparatus and conditions of the prior art can be used while otherwise excepting those differences as are defined in the claims. It will be appreciated, however, that the furnace can, to advantage, have a relatively enlarged reaction zone into which air and liquid feedstock can be axially injected so that the resulting blazing, exothermic reaction of the feedstock with oxygen by injection of water goes unimpeded and impingement of unvaporized feedstock hydrocarbon on the walls of the reaction chamber is thus avoided.

The present invention can be employed to particular advantage in the manufacture of conductive furnace (CF) blacks which are characterized by an unusually low electrical resistivity and, hence, a high electrical conductivity. They can also have a high surface area as indicated by iodine adsorption, but will not impart excessive viscosity to polymers or liquid vehicles in which the black is incorporated, e.g. rubbers, plastics or paint vehicles. It has been found that such blacks can be produced in accordance with the present invention by injecting air and the feedstock hydrocarbon and water streams into a vertically elongated furnace, injecting the feedstock stream and a surrounding air stream in an upward direction while injecting the water perpendicularly into the injected feedstock stream, and burning a portion of the feedstock with the injected air, after contact with the water stream, in order to produce the hot combustion gases within which the remainder of the feedstock is pyrolyzed.

With reference to FIGS. 1 and 2, the invention will now be described with respect to an embodiment thereof whereby the aforementioned conductive furnace (CF) carbon blacks are produced.

Figures 1, 2:
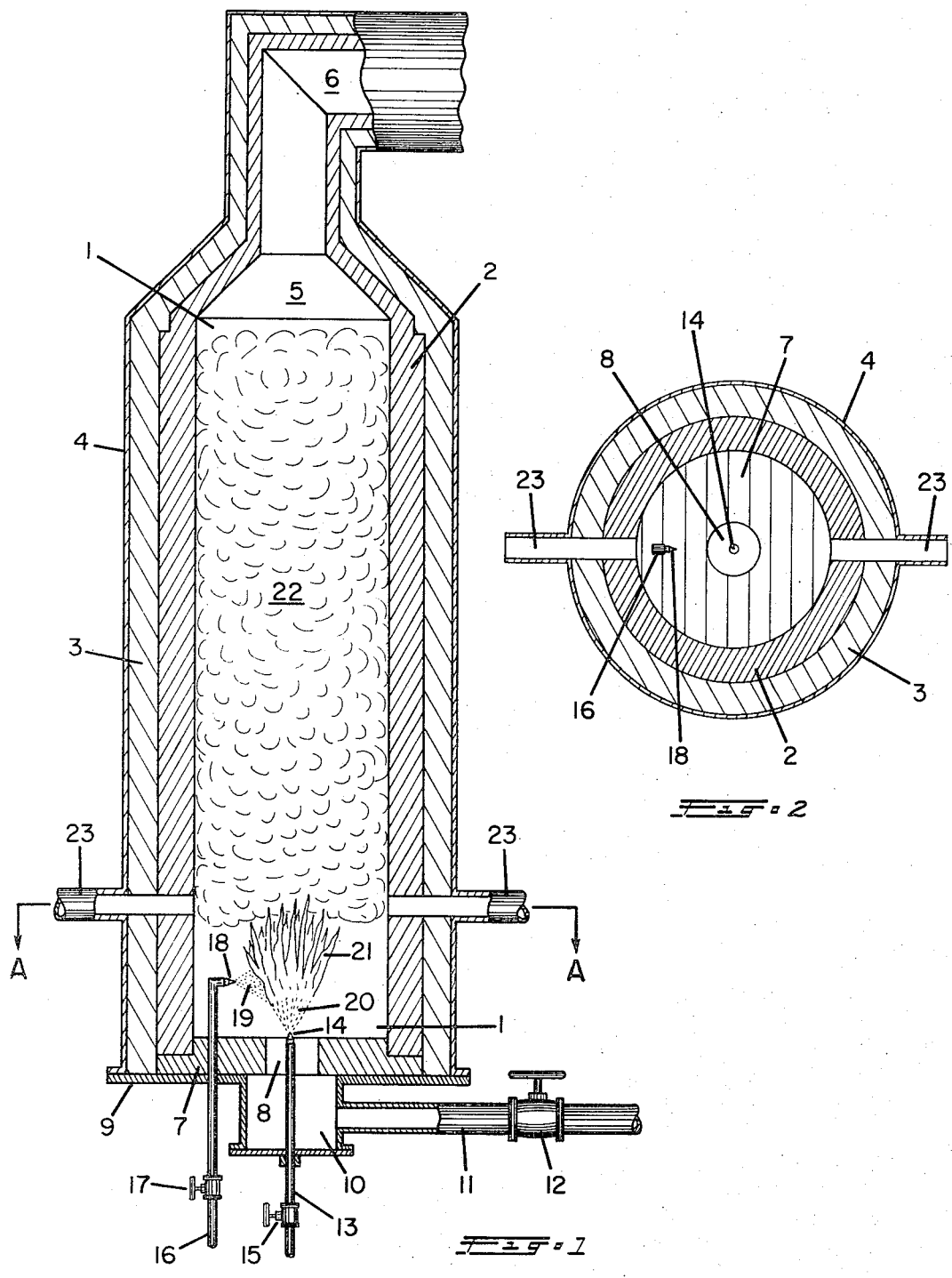
FIG. 1 is a sectional side view of a vertically elongated cylindrical furnace that can be used in the practice of the invention.
FIG. 2 is a cross-sectional view of the furnace of FIG. 1 taken along the line A — A of FIG. 1 and shown in a somewhat smaller scale.

The cylindrical reaction chamber or carbon black formation zone 1 of the furnace is surrounded by a refractory wall 2, a layer of insulation 3, and an outer metal sheath 4. The furnace has a concial top section 5 which connects with a breeching 6. The breeching leads into a cooler and then into a conventional separatory system, neither of which is shown. The carbon black aerosol is quenched with water in the cooler and the carbon black is then separated and recovered from the aerosol by means of the separatory system.

The bottom of the furnace has a refractory floor 7 with a central opening 8 which leads into chamber 1. The floor 7 is supported by a bottom plate 9 which is attached to the sheath 4. An air box 10 is attached to the bottom plate 9 and is aligned over the floor opening 8 so that air which is blown into the box 10 through conduit 11 is discharged upwardly into chamber 1. The flow of air through conduit 11 and into the furnace is controlled by means of a valve 12.

Liquid feedstock hydrocarbon is injected into the furnace chamber by means of a sprayer 13 having an atomizer tip 14 and a flow-control valve 15. Another sprayer 16 extends through the floor 7 of the furnace and into chamber 1 and is provided with a flow-control valve 17 and an atomizer tip 18. Sprayer 16 is used to inject a stream of liquid water 19 into the stream of liquid feedstock hydrocarbon 20 that is injected into the furnace. The atomizer tip 18 is directed perpendicularly with respect to the axis along which the feedstock hydrocarbon is discharged from atomizer tip 14, thereby assuring intersection of the liquid water stream 19 and the liquid feedstock stream 20. It is preferably that both the feedstock sprayer 13 and the water sprayer 16 be adjustable along their longitudinal axes to permit altering of the location at which the water and feedstock streams intersect within chamber 1.

In operation, air, feedstock hydrocarbon and water are fed into the furnace at substantially constant, preestablished rates through conduit 11 and the sprayers 13 and 16 respectively. Ignition of the resulting mixture following collision of the water stream 19 and the hydrocarbon stream 20 in the presence of air entering the furnace through floor opening 8 results in formation of a flame 21 above the floor 7 of the furnace. The flame is caused by combustion of part of the feedstock hydrocarbon stream 20 with the entering air and is initiated and promoted by injection of the water stream 19, as previously described. As the unburned portion of the feedstock hydrocarbon continues to travel upward in chamber 1, it becomes mixed with hot combustion gases produced by the flame and is thereby further vaporized and pyrolyzed by absorption of heat from the hot gases. A blanket 22 is formed in the upper part of chamber 1 and consists of carbon black, partially decomposed hydrocarbons from the feedstock, hot combustion gases, and gaseous products which result from pyrolysis of the feedstock.

Temperatures within the furnace reaction chamber are maintained within the range of about 2,300°–3,000°F. Injection of water into the furnace in accordance with the present invention is insufficient to cause any significant overall quenching effect, but can cause a substantial alteration of the temperature profile along the length of the furnace chamber.

The effluent from the furnace which enters breeching 6 is an aerosol of carbon black suspended in gaseous products of combustion and thermal decomposition of the feedstock hydrocarbon. Since the reaction chamber 1 is elongated and highly heated, the carbon black of the effluent aerosol will contain little if any oily residue (stain) from pyrolysis of the feedstock, i.e., thermal decomposition of the feedstock can be carried essentially to completion within the reaction chamber. To facilitate the development of high temperatures within the reaction chamber 1, auxiliary air can be introduced at controlled rates through conduits 23 for burning of combustible gaseous products of the pyrolysis reaction which reside in the blanket 22.

EXAMPLES

A furnace arrangement substantially the same as shown in FIGS. 1 and 2 was employed in the production of carbon black. The reaction chamber 1 had a diameter of 4.25 feet and a height of 12 feet. The diameter of the floor opening 8 was 14 inches. A typical analysis for the feedstock hydrocarbon used in each of the following experiments is shown below:

Feedstock Analysis

| | | |
|---|---|---|
| API Gravity | | 0.2 |
| Viscosity — | SSU-130°F. | 594 |
| | SSU-210°F. | 67 |
| Molecular Weight | | 295 |
| Index of Refraction | | 1.648 |
| % Sulfur | | 1.06 |
| % Ash | | 0.003 |
| % Carbon | | 90.74 |
| % Hydrogen | | 8.42 |
| % Benzene Insoluble | | 0.039 |
| % Asphaltenes | | 0.05 |
| Average Boiling Point | | 790°F. |
| UOP K Factor | | 10.0 |

Experiment I

With the feedstock atomizer tip 14 withdrawn into the floor opening 8 about 4 inches below the upper surface of the floor 7, the feedstock was injected into the furnace at a rate of 90 gallons per hour (60°F.), after having been preheated to a temperature of 200°F. Air, preheated to 825°F., was injected into the furnace through floor opening 8 at the rate of 38,000 cubic feet per hour and through conduits 23 at the rate of 22,000 cubic feet per hour (60°F.). Initially, no water was injected into the liquid feedstock stream from the water atomizer tip 18. However, after operating for 1 hour, water at 75°F. was fed to the atomizer tip at the rate of 17 gallons per hour, and the water rate was raised to 45 gallons per hour after two hours of operation. The water atomizer tip was located 10 inches above the top surface of the furnace floor, 16 inches from the longitudinal center line of the feedstock sprayer 13 and the tip was directed perpendicularly toward the longitudinal center line. Atomizer tips 14 and 18 discharged a hollow cone of droplets at an angle of 60° and 80° respectively.

Carbon black samples collected during this experiment exhibited the following properties:

| Water Rate | Dibutylphthalate Adsorption | Iodine Adsorption | Transmission % |
|---|---|---|---|
| 0 | 174 | 164 | 100 |
| 17GPH | 188 | 244 | 100 |
| 45GPH | 149 | 170 | — |

From the above it can be seen that the injection of water into the feedstock hydrocarbon at the rate of 17GPH (thus providing a feedstock to water volume ratio of about 5/1) effected a significant increase in DBP adsorption and a striking elevation of iodine adsorption. When, however, the water rate was increased to 45GPH (feedstock to water ratio of 2/1) the DBP adsorption dropped off and the iodine adsorption was not significantly changed. It will be appreciated that increased electrical conductivity of a carbon black is associated with elevation of DBP adsorption and iodine adsorption. It should also be pointed out that when water was not being injected through the water atomizer tip, temperatures within the furnace reaction chamber were 2,040°F., 2,370°F. and 1,980°F. along the first 4 feet above the floor of the furnace, and these were increased to 2,340°F., 2,450°F. and 2,460°F. when water was injected as indicated at the 17GPH rate. Temperatures nearer the top of the furnace were within the range of about 2,500°–2,650°F.

The carbon black aerosol which was discharged from the furnace was not quenched with water until it had traveled about 40 feet through the breeching 6 to the cooler, and at which point sufficient water was injected to reduce the temperature of the aerosol to about 450°F.

Experiment II

Using the same furnace sprayer arrangements and the same input conditions for air and feedstock hydrocarbon as in Experiment I, the location, condition and amount of water injection was altered to demonstrate the effect of these variables on properties of the resulting carbon black.

In Case "A" water was injected into the carbon black furnace as a quench for the aerosol. The water injection point was about 13 feet above the floor of the furnace while using a rate of 30 gallons per hour (feedstock hydrocarbon to water ratio of 3/1).

In Case "B" liquid water was injected from atomizer tip 18 into the liquid hydrocarbon stream from a position 24 inches above the furnace fl-or at the rate of 30GPH (feedstock hydrocarbon to water ratio of 3/1).

In Case "C" no liquid water was injected but saturated steam at 90 PSIG was introduced into the furnace in comixture with the liquid feedstock hydrocarbon stream.

In Case "D" no extraneous water in any form was introduced into the furnace.

Carbon black samples recovered during Experiment II exhibited the following properties:

| Case | Water Injection | DBP Adsorption | Iodine Adsorption | Transmission % |
|---|---|---|---|---|
| A | Aerosol Quench Only | 166 | 202 | 90 |
| B | Invention | 188 | 270 | 100 |
| C | Steam Only | 150 | 136 | 100 |
| D | None | 150 | 126 | 100 |

As can be seen from Experiment II, the use of water in accordance with the invention, Case "B," raised both the DBP and the iodine adsorption of the resulting black. This becomes readily apparent by comparing the DBP and iodine adsorption values obtained in Case "B" to those obtained during the exclusion of water in Case "D." The black produced in Case "B" was also characterized by a freedom from residually oily matter, this being indicated by the 100 percent transmission value. Use of a conventional water quench for the aerosol in Case "A" instead of injecting the water in accordance with the invention resulted in a black with measurable stain and inadequate DBP and iodine adsorptions. Use of steam only, Case "C," did not effect any significant change in carbon black properties in comparison to the black produced during Case "D" wherein no extraneous water in any form was introduced into the feedstock stream or the carbon black aerosol.

Experiment III

Using the same equipment and process conditions Experiment I was repeated except that water was continuously introduced through atomizer 18 at the rate of 19 gallons per hour. The resulting carbon black was then compared to a commercially available and widely employed CF furnace black, Corductex SC, produced in accordance with a prior art process that is described in U.S. Pat. No. 3,490,869. Properties of the two blacks are shown in the following table.

Table I

|  | Experiment III | Prior Art |
|---|---|---|
| Arithmetic Mean Particle Diameter, A° | 210 | 170 |
| Surface Area, M²/gm. | 245 | 200 |
| Dibutylphthalate Adsorption, c.c./100 gm. | 175 | 110 |
| pH | 6.5 | 8.0 |
| Fixed Carbon, %, (Moisture Free) | 99.2 | 0.8 |
| Volatile Matter, %, (Moisture Free) | 97.8 | 2.2 |

Both of the carbon blacks were compounded into plastic resins using the following receipes:

Recipe I

Ethylene Vinyl Acetate, 30% Carbon Black
| Polymer | 210.0 parts |
| Carbon Black | 90.0 parts |
| Antioxidant | 1.0 parts |

Recipe II

Polyvinyl Chloride, 20% Carbon Black
| Polymer | 190.0 parts |
| Carbon Black | 63.0 parts |

Recipe II—Continued

Polyvinyl Chloride, 20% Carbon Black

| | |
|---|---|
| DOP | 40.5 parts |
| Soybean Oil Epoxide | 13.5 parts |
| Lead Stearate Stabilizer | 1.0 parts |

Recipe III

Polyvinyl Chloride, 30% Carbon Black

| | |
|---|---|
| Polymer | 164.0 parts |
| Carbon Black | 93.5 parts |
| DOP | 35.0 parts |
| Soybean Oil Epoxide | 12.0 parts |
| Lead Stearate Stabilizer | 1.0 parts |

Three batches of each recipe were made up so that any differences in properties effected by milling the compounds for 2, 5 and 10 minute periods of time could be determined. The milled compounds were then tested to determine their electrical resistivity. Results of the testing are shown in Table II.

Table II

EVA Compound — Recipe I ivity ASTM D-991(Ohm/cm.)

| | Time in Mill, Min. | Dispersion* | Comparative Volume Resistivity | | |
|---|---|---|---|---|---|
| | | | Room Temp. | 120°C. | Cooled to Room Temp. |
| Black of Ex. III | 2 | 5.9 | 58 | 252 | 243 |
| | 5 | 3.7 | 36 | 128 | 196 |
| | 10 | 3.9 | 176 | 416 | 523 |
| Prior Art Black | 2 | 4.7 | 128 | 906 | 699 |
| | 5 | 4.7 | 61 | 1088 | 832 |
| | 10 | 4.2 | 99 | 391 | 917 |

PVC Compound — Recipe II ivity ASTM D-991(Ohm/cm.)

| | Time in Mill, Min. | Comparative Volume Resistivity | | |
|---|---|---|---|---|
| | | Room Temp. | 90°C. | Cooled to Room Temp. |
| Black of Ex. III | 2 | 433 | 527 | 320 |
| | 5 | 380 | 407 | 380 |
| | 10 | 6182 | 12806 | 3533 |
| Prior Art Black | 2 | 1716 | 1288 | 2575 |
| | 5 | 4082 | 4173 | 4536 |
| | 10 | 2091 | 1523 | 3544 |

PVC Compound — Recipe III ivity ASTM D-991 (Ohm/cm.)

| | Time in Mill, Min. | Comparative Volume Resistivity | | |
|---|---|---|---|---|
| | | Room Temp. | 90°C. | Cooled to Room Temp. |
| Black of Ex III | 2 | 49 | 127 | 11 |
| | 5 | 20 | 27 | 15 |
| | 10 | 345 | 399 | 388 |
| Prior Art Black | 2 | 14 | 38 | 41 |
| | 5 | 24 | 40 | 32 |
| | 10 | 13 | 55 | 47 |

*Light microscope examination; 2% letdown; relative rating 1 to 10, Best to Worst.

From Table-II the following superior aspects of the carbon black of the present invention become apparent:

1. The lower electrical resistivity and hence the high electrical conductivity that is imparted to the compound.
2. Lower loss of electrical conductivity after heating and then cooling the compound. In fact, conductivity of the compound is sometimes enhanced by the heating and cooling when the carbon black of the present invention is employed.
3. Optimum electrical conductivity is usually developed in a shorter milling time and it should be noted that over milling can cause sharp drops in the conductivity.
4. More complete dispersion of the carbon black throughout the compound is effected in a shorter milling cycle.

The carbon black of Experiment III and the prior art black were mixed with synthetic rubbers and a cross-linked polyethylene in accordance with the following recipes:

Recipe IV

| | | |
|---|---|---|
| EPDM Rubber | 100 | Parts |
| Carbon Black | 60 | |
| ZnO | 5 | |
| Extender Oil | 5 | |
| 40% Dicumyl Peroxide | 7 | |
| Sulfur | 0.3 | |
| | 177.3 | Parts |

Cure 45 mins. at 330°F.

Recipe V

| | | |
|---|---|---|
| Butyl Rubber | 100 | Parts |
| Carbon Black | 50 | |
| Naphthenic Oil | 10 | |
| ZnO | 5 | |
| Benzothiazyl Disulfide | 1 | |
| Tetramethyl Thiuram Disulfide | 1 | |
| Sulfur | 1 | |
| | 168 | Parts |

Cure 60 mins. at 307°F.

Recipe VI

| Neoprene Rubber | 100 | Parts |
|---|---|---|
| Carbon black | 50.0 | |
| Plasticizer | 10.0 | |
| ZnO | 5.0 | |
| MgO | 4.0 | |
| Antioxidant | 1.0 | |
| Stearic Acid | 0.5 | |
| Accelerator | 0.5 | |
| | 171.0 | Parts |

Cure 40 mins. at 311°F.

Recipe VII

| | 40% | | 30% | |
|---|---|---|---|---|
| Polyethylene | 100 | Parts | 100 | Parts |
| Carbon Black | 66.5 | | 40 | |
| Trimethydihydro-quinoline | 0.5 | | 0.5 | |
| 40% Dicumyl Peroxide | 5.0 | | 5.0 | |
| | 172.0 | Parts | 145.5 | Parts |

Cure 30 mins. at 330°F.

After curing, the properties of the rubber and cross-linked polyethylene compounds were determined and are presented in Tables III – VII.

Table III

EPDM Synthetic Rubber at 60 PHR Carbon Black

| of Ex. III | Black of Ex. III | | Prior Art Black | |
|---|---|---|---|---|
| | Normal Mixing | Extra Milling | Normal Mixing | Extra Milling |
| Modulus (psi) at 300% | 2440 | 2390 | 2380 | 2360 |
| Tensile Strength (psi) | 2760 | 2830 | 3320 | 3330 |
| Elongation (%) | 340 | 350 | 330 | 330 |
| Shore Hardness | 69 | 69 | 65 | 64 |
| log Volume Resistivity | 5.4 | 5.4 | 5.9 | 6.2 |
| Vol. Resistivity (ASTM D-991) (ohm-cm) | 60 | 145 | 503 | 782 |

Table IV

Butyl Synthetic Rubber at 50 PHR Carbon Black

| of Ex. III | Black of Ex. III | | Prior Art Black | |
|---|---|---|---|---|
| | Normal Mixing | Extra Milling | Normal Mixing | Extra Milling |
| Modulus (psi) at 300% | 900 | 790 | 900 | 830 |
| Tensile Strength (psi) | 1930 | 2000 | 2540 | 2630 |
| Elongation (%) | 660 | 700 | 660 | 700 |
| Shore Hardness | 63 | 58 | 60 | 56 |
| log Volume Resistivity | 4.75 | 6.05 | 5.00 | 5.65 |
| Vol. Resistivity (ASTM D-991) (ohm-cm) | 5.8 | 11.5 | 24.0 | 17.9 |

Table V

Neoprene Rubber at 50 PHR Carbon Black

| | Ex. III | Prior Art |
|---|---|---|
| Modulus psi at 100% | 1600 | 950 |
| Tensile Strength (psi) | 3140 | 3590 |
| Elongation (%) | 200 | 290 |
| Shore Hardness | 80 | 76 |
| log Volume Resistivity | 6.1 | 6.0 |
| Vol. Resisitivity (ASTM D-991) (ohm-cm) | 91 | 100 |

Table VI

Cross-linked Polyethylene

| | Ex. III | Prior Art | Ex. III | Prior Art |
|---|---|---|---|---|
| Modulus (psi) 100% | — | 2870 | — | — |
| Modulus (psi) 200% | — | — | 2860 | 2620 |
| Tensile (psi) | 3310 | 3100 | 3110 | 3070 |
| Elongation (%) | 75 | 135 | 270 | 295 |
| Shore Hardness | 60 | 67 | 60 | 60 |
| log Volume Resistivity | 4.6 | 4.9 | 5.8 | 6.3 |

Table VII

Cross-linked Polyethylene Compound, 40% Carbon Black
Volume Resistivity (ASTM D-991) (ohm-cm)

| | Initial Reading at Room Temp. | 16 Hr. at 90°C. | Room Temp. After Heating |
|---|---|---|---|
| Ex. III | 5.45 | 9.08 | 5.45 |
| Prior Art | 22.3 | 54.4 | 15.7 |

From the data presented in Tables III – IV, the ability of carbon blacks produced in accordance with the invention to impart superior electrical conductivity to compounds of rubber and cross-linked polyethylene is clearly demonstrated.

The carbon black of Experiment III and the prior art black were dispersed in a medium oil alkyd primer coating and the resulting dispersions were then evaluated for degree of dispersion, viscosity and electrical resistivity (as a measure of electrical conductivity). Results of this evaluation are presented in Table VIII.

Table VIII

Medium Oil Alkyd Primer Coating* (20% Carbon Black)

| | Dispersion (P.C.)** | Brookfield Viscosity in cps. with No.5 Spindle | | | Resistivity (ohm-cm) |
|---|---|---|---|---|---|
| | | 10 rpm. | 50 rpm. | 100 rpm. | |
| Ex. III | 8.3 | 1640 | 448 | 316 | $2.42 \times 10^3$ |
| Prior Art | 7.0 | 1000 | 328 | 180 | $3.43 \times 10^5$ |

Nitrocellulose Lacquer Coating* (35% Carbon Black)

| | | | | | |
|---|---|---|---|---|---|
| Ex.-III | 7.2 | 6400 | 1760 | 1320 | 9.9 |
| Prior Art | 5.0 | 8400 | 2640 | 2040 | 14.4 |

*Ball milled, 6 hrs.
**Production Club Gage

It can be seen from Table VIII that the carbon black of the invention provided better dispersion and much greater electrical conducitivity in the primer coating without excessively increasing the viscosity thereof. In the nitrocellulose lacquer coating, dispersion of the carbon black of the invention was superior, electrical conductivity of the coating was improved by its use while the viscosity thereof was significantly reduced.

It is felt that the superior nature of the carbon black produced in accordance with the invention, in comparison to a widely used, commerically successful conductive furnace black of the prior art, has been adequately demonstrated in Experiment III.

Although the practice of the present invention has been described with reference to a specific carbon black feedstock, it will be appreciated that still other hydrocarbons can be employed for the purpose. Preferred feedstocks are high molecular weight, highly aromatic oils which are cracking or distilling residuals from petroleum or coal which have a BMCI of about 90 to about 160, and more preferably a BMCI between about 115 to about 135, and have a viscosity of 200 SSU or less when heated to about 200°F.

It will alo be appreciated that the exact angle at which the water stream is directed into the feedstock stream is not critical, nor is a specific impact of the two streams required. It is only necessary that the water stream travel in a direction which results in its intersection with the liquid feedstock stream, and only such velocity is required as will result in penetration and hence mixing of the feedstock stream with the water stream. The water and feedstock injection angles and velocities are thus matters of choice which will be obvious to one skilled in the art of making carbon black after benefit of the new teachings made available by the present disclosure.

While the present invention has been described with reference to particular apparatus, process conditions, raw materials, construction materials and the like, it will nonetheless be understood that still other embodiments will become apparent which fall within the spirit and scope of the invention that is defined in the following claims.

What is claimed is:

1. In a process for producing an oil furnace carbon black, the method of initiating and promoting pyrolysis of the carbon black feedstock which comprises:
   a. injecting a liquid stream of carbon black feedstock hydrocarbon into a highly heated reaction chamber of a carbon black furnace,
   b. introducing a stream of free oxygen-containing gas into said furnace and contacting the free oxygen with the stream of liquid feedstock hydrocarbon that is being injected into said chamber, the quantity of free oxygen that is introduced into the chamber being sufficient to burn only a portion of the injected feedstock hydrocarbon,
   c. injecting a stream of liquid water into the feedstock stream after injection of the feedstock into said chamber and during contact of the feedstock stream with the free oxygen in the chamber, the liquid water being injected into the feedstock stream while the feedstock is still substantially in a liquid phase but after heating of the feedstock stream to a temperature which is substantially in excess of that of the water stream that is injected into it, the volume ratio of injected feedstock hydrocarbon to injected liquid water being within the range of about 3/1 to about 10/1,
   d. immediately burning the mixture which results from intersection of the liquid water and feedstock hydrocarbon streams, and
   e. thermally decomposing a remaining, unburned portion of the feedstock hydrocarbon within the furnace reaction chamber by absorption of heat from hot gases produced by combustion of a fuel.

2. The method of claim 1 wherein the free oxygen-containing gas is air.

3. The method of claim 1 wherein the feedstock hydrocarbon is a high molecular weight, highly aromatic oil.

4. The method of claim 1 wherein a portion of the feedstock is burned as fuel in producing the hot combustion gases within which the unburned portion of the feedstock hydrocarbon is thermally decomposed.

5. The method of claim 1 wherein the temperature of the liquid feedstock stream is in excess of about 500°F. when intersected by the liquid water stream.

6. The method of claim 1 wherein the $\Delta T°$ between the liquid feedstock stream and the liquid water stream upon intersection of the two streams is within the range of about 300°F. to about 700°F.

7. The method of claim 1 wherein the volume ratio of the injected liquid feedstock hydrocarbon and the liquid water that is injected into it is within the range of about 4/1 to about 6/1.

8. The method of claim 1 wherein the furnace reaction chamber is elongated, the feedstock hydrocarbon is injected axially into the reaction chamber, free oxygen is introduced into the chamber as an air stream which surrounds the feedstock hydrocarbon stream, and the water stream is injected into the feedstock hydrocarbon stream following contact of the injected feedstock with the air stream.

9. The method of claim 8 wherein the funace reaction chamber is vertically elongated, the feedstock stream and the air stream are introduced axially upward into the chamber, a portion of the feedstock hydrocarbon is burned as fuel in producing the hot combustion gases within which the unburned portion of the feedstock hydrocarbon is thermally decomposed, and thermal decomposition of the feedstock occurs within a blanket which resides in the upper section of the furnace reaction chamber.

10. In an oil furnace process for producing a carbon black wherein a liquid stream of feedstock hydrocarbon is injected into a reaction chamber of a carbon black furnace and a portion of the feedstock hydrocarbon is burned with free oxygen in the reaction chamber, hot combustion gases are produced by the burning of the feedstock hydrocarbon, the remainder of the feedstock hydrocarbon is thermally decomposed by absorption heat from the hot gases thus formed, an aerosol is formed of carbon black suspended in the combustion gases and gaseous products formed by thermal decomposition of the hydrocarbon, and the carbon black is then separated and recovered from the gaseous constituents of the aerosol, the method of producing a carbon black having high electrical conductivity which comprises injecting a stream of liquid water into said liquid feedstock stream after injection of the feedstock into the furnace reaction chamber and during contact of the feedstock with free oxygen in the chamber, the volume ratio of injected feedstock hydrocarbon to injected water being within the range of about 3/1 to about 10/1, the liquid water being injected into the feedstock stream while the feedstock is still substantially in a liquid phase but after heating of the feedstock stream to a temperature which is substantially in excess of the water stream that is injected into it, and immediately burning the mixture which results upon injection of the water stream into the feedstock hydrocarbon stream.

11. The method of claim 10 wherein the temperature of the feedstock hydrocarbon stream is in excess of about 500°F. when intersected by the liquid water stream.

12. The method of claim 10 wherein the $\Delta T°$ between the liquid feedstock stream and the liquid water stream upon intersection of the two streams is within the range of about 300°F. to about 700°F.

13. The method of claim 10 wherein the volume ratio of the injected liquid feedstock hydrocarbon and the liquid water that is injected into it is within the range of about 4/1 to about 6/1.

* * * * *